United States Patent Office 3,300,702
Patented Jan. 24, 1967

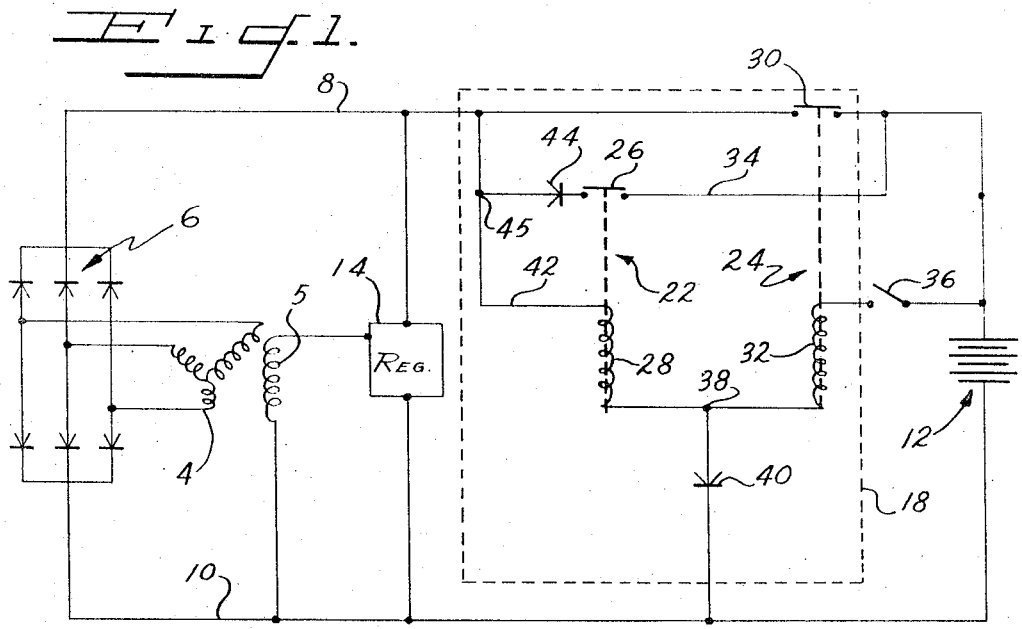
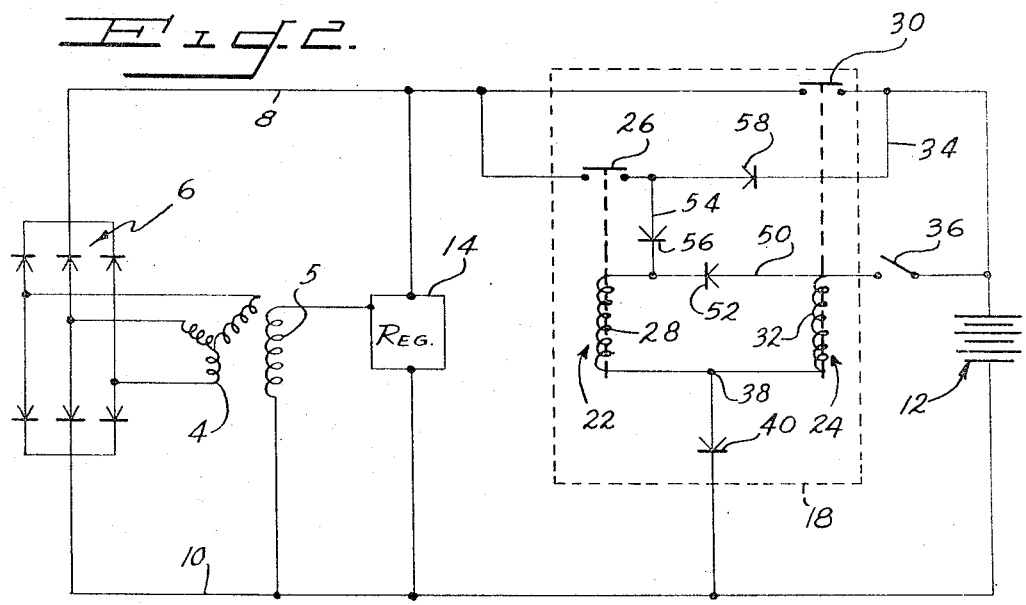
INVENTOR.
Ray C. Noddin
BY Chapin & Neal
Attorneys

3,300,702
PROTECTION DEVICE FOR SOLID STATE
BATTERY CHARGING SYSTEMS
Ray C. Noddin, Chicopee, Mass., assignor to Globe-Union Inc., Milwaukee, Wis., a corporation of Delaware
Filed Sept. 3, 1963, Ser. No. 306,173
2 Claims. (Cl. 320—25)

This invention relates to solid state battery-alternator systems and more particularly to a device for protecting the sensitive elements of the system against improper connection to a potential source.

In recent years the use of solid-state electronic devices has been extended in many new fields, including the battery-alternator field for voltage regulators and rectifiers. While the solid-state electronic components are usually reliable and compact, it has been found that protection must be provided against improper connection. For example, if a regulator is connected to the wrong battery terminals, serious damage to the transistors of the regulator will result. Similarly, semiconductor rectifiers used in alternator systems may also be damaged.

The principal object of this invention is to provide means for protecting solid state electronic components of a battery-alternator system.

Another object of this invention is to prevent discharge of the battery of a battery-alternator system caused by alternator diode leakage.

The above and other objects of this invention will be more readily apparent from the following description and with reference to the accompanying drawing in which:

FIG. 1 is a circuit diagram illustrating one type of circuit protector embodying this invention; and FIG. 2 is a circuit diagram of a modified type of circuit protection embodying the invention.

Referring in detail to the drawing, a battery alternator system is shown. The alternator, comprising generating winding 4 and field coil 5, serves as the electrical generating component of the ignition system. The output of the alternator is converted to direct current by means of a rectifier 6 which may be a semiconductor type. The rectifier output is connected by means of leads 8 and 10 to the terminals of a storage battery 12. Across the leads 8 and 10 is connected a transistor voltage regulator 14 which controls the current flow through the field coil 5 of the alternator 4 whereby the alternator output is controlled. The regulator 14 may be of the same type as disclosed in copending application Ser. No. 253,961, filed Jan. 25, 1963, now U.S. Patent 3,247,443 and assigned to the same assignee as the instant application.

In circuit with the battery, alternator and rectifier is a circuit protector 18 which is hereinafter referred to as a guard. The guard comprises a pair of relays shown generally at 22 and 24. The relay 22 consists of coil 28 and contact arm 26 and the relay 24 comprises contact arm 30 operated by coil 32. The contact 30 serves to open and close lead 8 to the battery 12 and contact 26 serves to open and close lead 34 connected in parallel with the relay arm 30.

The coil of the relay 24 is connected in series with an ignition switch 36, which as shown is connected to lead 8 at the positive battery terminal. The other side of coil 32 is connected to junction 38. Junction 38 is connected to coil 28 and to a rectifier or blocking diode 40, which blocks current flow through the coil 32 if the leads 8 and 10 are reversedly connected to the battery terminals. The diode 40 may be of a semiconductor rectifier. Coil 28 is also connected by means of a lead 42, to junction 45, in turn connected to the lead 8.

A diode 44 in the lead 34 has sufficiently high impedance to cause current flow primarily in lead 8, through relay arm 30 when the latter is closed.

In operation of the FIG. 1 battery-alternator system, when the ignition switch 36 is closed, the battery is connected in series with the relay coil 32 which is therefore energized. The circuit being from one battery terminal, through switch 36, coil 32, diode 40 to the other battery terminal. In response to energization of the coil 32, the relay arm 30 completes the circuit 8 from the rectifier 6 to the battery 12. If, however, the battery had been incorrectly connected, i.e., reversed polarity, the diode 40 would block current flow in the ignition switch loop and prevent energization of coil 32. Consequently, contact 30 would remain open and the circuit 8 to the rectifier 6 and regulator 14 would not be energized. Thus no damage would be sustained by the transistors in the regulator and rectifiers.

With the leads 8 and 10 connected to the correct terminals of the battery, when the ignition switch 36 is closed, coil 32 is energized and relay arm 30 closed. A circuit is also completed from the positive battery terminal through contact arm 30, the other relay coil 28 and diode 40. Thus coil 28 is energized and relay arm 26 is closed completing shunt circuit 34 which provides an alternate current path from the alternator to the battery. This circuit carries a very small proportion of charging current during operation of the ignition system, however, because diode 44 is selected as a high impedance circuit component. Thus when the alternator is running, current from the rectifier 6 charges the battery through the closed relay arm 30. The regulator 14 controls current flow through the field coil 5 and thereby maintains the output of the alternator at a desired level as disclosed in the copending application referred to above.

In addition to reverse polarity protection this invention also protects the relay points against damage caused by arcing. This protection is afforded by the staggered operation of relays 22 and 24. When the ignition switch 36 is opened, current will cease to flow in the coil 32 and the arm 30 will be opened. Since at this time, the alternator would still be running high voltage arcing would normally be expected, however, because the relay 22 is still energized the shunt circuit 34 provides an alternate path for the battery charging current. Relay 22 remains energized until the output of the alternator has dropped so that current through the relay coil 28 is no longer sufficient to maintain the arm 26 closed. Relay 22 then operates to open lead 34. It will be appreciated that after the ignition switch is open the alternator speed will decrease so that when the relay arm 26 is opened little or no arcing occurs.

While the embodiment shown in FIG. 1 offers protection of the alternator rectifier and its regulator against the reverse battery connection during stationary conditions of the engine, if the engine were successfully started after the battery was installed with reverse polarity, protection may not be afforded since relay 28 would be energized by the alternator current closing contacts 26. To protect against this condition the circuit as shown in FIG. 2 is provided. In this circuit similar components are assigned the same reference characters as above. In addition a lead 50 interconnects the high potential ends of the relays coils 32 and 28. A diode 52 is provided in this lead to block charging current from the coil 32 of relay 24. A lead 54 connects the lead 50 with the shunt circuit 34 and rectifier 56 is provided in the lead 54 to prevent current flow to the ignition circuit should the battery be reverse connected. A rectifier 58 is provided in the shunt circuit 34 on the battery side of the relay arm 26, thus this rectifier serves the same purpose as the diode 44 disclosed in FIG. 1. Therefore, should the battery be installed and started with the reverse polarity connection, energization of both relay coils 28 and 32 is thus prevented whereby both relay points 30 and 26 remain open. No energization of either relay coil can occur under any condition and neither points 30 or points 26 will ever become closed.

In this operation of this circuit, when the ignition switch 36 is closed and the battery polarity is correct, current will flow through relay coil 32 and diode 40 to close the relay arm 30. At the same time current will flow through diode 52, relay coil 28 and diode 40, causing relay arm 26 to close. During engine operation charging current from the alternator will flow through the relay 30 in a manner described in the connection with the FIG. 1 embodiment of this invention. When the engine is to be shut down, ignition switch 36 is opened. As a result, relay coil 32 is deenergized and the contact arm 30 opens. Coil 28 remains energized, however, by a circuit through the closed arm 26 and diode 56. The arm 26 remains closed and charging current continues to flow through the shunt circuit 34 of the battery until the output voltage of the alternator has dropped due to the decrease in engine speed. When the current has dropped sufficiently so that the relay coil 28 will not hold the contact arm 26 closed, the contact will open without arcing.

With this circuit the regulator and rectifier may be connected to the ignition switch terminal and still afford protection of the transistor element of the regulator and the alternator. The alternator guard thus provides complete isolation of the battery from the regulator and the alternator.

Having thus described this invention, what is claimed is:

1. Battery charging system comprising in combination a battery, a transistorized voltage regulator, an alternating current generating source, a rectifier for converting to direct current the output of said generating source and having direct current output terminals, circuit means interconnecting the direct current terminals of said rectifier to the battery and regulator, first and second relay coils connected in parallel cross said direct current terminals and the terminals of said battery, an ignition switch in series with said first relay coil, a blocking diode in series with said relay coils poled to prevent energization of said coils if said circuit means is connected to the incorrect polarity of said battery, said circuit means including parallel circuits interconnecting one terminal of said battery to one of said direct current terminals of the rectifier, said parallel circuits containing first and second contacts controlled respectively by said first and second relay coils and each completing one of said parallel circuits between the battery and the direct current output of said rectifier when said battery is correctly connected to said circuit, a rectifier in one of said parallel circuits in series with said second relay contact and having sufficiently high impedance to cause direct current output of the rectifier to flow essentially through the other of the said parallel circuits when both said relays are closed, while providing a path for said direct current output when the first relay is not energized by said battery whereby protection against arcing is provided upon the opening of said ignition switch.

2. A battery charging system as set forth in claim 1 and including second circuit means interconnecting the high potential ends of said relay coils to each other and to said parallel circuit containing said second relay contact, said second circuit means including a diode between the high potential ends of said relay coils to protect the regulator if the generating source is activated with a reverse polarity battery connection.

References Cited by the Examiner
UNITED STATES PATENTS

| | | | |
|---|---|---|---|
| 2,736,857 | 2/1956 | Klug | 317—11 X |
| 3,018,414 | 6/1958 | Albright | 317—11 |
| 3,085,187 | 4/1963 | Godshalk | 320—25 |
| 3,129,373 | 4/1964 | Godshalk et al. | 320—25 |
| 3,219,903 | 11/1965 | Larson | 320—61 X |

JOHN F. COUCH, *Primary Examiner.*

LLOYD McCOLLUM, *Examiner.*

S. WEINBERG, *Assistant Examiner.*